United States Patent
Ozaki et al.

(10) Patent No.: US 7,248,899 B2
(45) Date of Patent: Jul. 24, 2007

(54) PORTABLE TERMINAL APPARATUS HAVING AN IMPROVED DISPLAY DRIVE CONTROLLER

(75) Inventors: Emi Ozaki, Yokohama (JP); Hideki Kuga, Kawasaki (JP); Tomoya Rokugawa, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/512,269

(22) PCT Filed: Apr. 17, 2003

(86) PCT No.: PCT/JP03/04917

§ 371 (c)(1),
(2), (4) Date: Dec. 20, 2004

(87) PCT Pub. No.: WO03/092250

PCT Pub. Date: Nov. 6, 2003

(65) Prior Publication Data

US 2005/0105715 A1 May 19, 2005

(30) Foreign Application Priority Data

Apr. 24, 2002 (JP) .............................. 2002-122443

(51) Int. Cl.
*H04M 1/00* (2006.01)
(52) U.S. Cl. ................... 455/566; 455/67.13; 455/425; 455/550.1; 379/201.04; 379/433.04; 345/2.3; 345/3.3; 345/3.4; 345/87; 345/169; 345/204; 345/617; 345/698; 345/699
(58) Field of Classification Search ................ 455/18, 455/66.1, 90.3, 413, 425, 343.1, 514, 550.1, 455/556.1, 566, 569.1, 574, 575.1, 575.2, 455/67.11, 67.13, 145, 570, 423; 345/7, 345/8, 158, 2.1, 2.3, 3.1, 3.3, 3.4, 87, 169, 345/204, 617, 698, 699; 379/93.17, 93.19, 379/93.23, 142.17, 144.08, 201.04, 433.04
See application file for complete search history.

(56) References Cited

U.S. PATENT DOCUMENTS 5,010,566 A * 4/1991 Seo ............................ 455/566

(Continued)

FOREIGN PATENT DOCUMENTS

EP 0 609 980 A2 8/1994

(Continued)

*Primary Examiner*—William Trost
*Assistant Examiner*—James D Ewart
(74) *Attorney, Agent, or Firm*—Pearne & Gordon LLP (57) ABSTRACT

A problem of this invention is to satisfy both of securement of visibility of a display unit and suppression of noises at the time of a telephone call etc. using a receiver and a microphone. In a portable terminal apparatus which relates to the invention, a control unit (16) judges whether a handsfree device (20) is connected or not, on the occasion that a telephone call operation is carried out by an operation unit (18) and a voice telephone call operation by a telephone call circuit (11) and a transmission/receiving unit (12) is started, and in case that the handsfree device (20) is not connected, it is judged that a user is making a telephone call by use of a receiver (13) and a microphone (14) in an apparatus main body in such a state that he puts an apparatus casing to his ear part, and at least one of a drive system, drive frequency of a display unit (19) which comprises a liquid crystal display is changed, and a drive operation giving priority over acoustic characteristics is carried out. On one hand, in case that the handsfree device (20) is connected, a drive operation with high picture quality giving priority over optical characteristics of the display unit (19) is carried out without changing the drive system etc.

19 Claims, 5 Drawing Sheets

U.S. PATENT DOCUMENTS

| | | | |
|---|---|---|---|
| 5,036,532 A * | 7/1991 | Metroka et al. | 455/566 |
| 5,224,151 A * | 6/1993 | Bowen et al. | 455/569.1 |
| 5,414,426 A * | 5/1995 | O'Donnell et al. | 341/176 |
| 5,488,391 A * | 1/1996 | Favot et al. | 345/156 |
| 5,586,182 A * | 12/1996 | Miyashita | 379/413 |
| 5,686,940 A * | 11/1997 | Kuga | 345/156 |
| 5,881,377 A * | 3/1999 | Giel et al. | 455/343.1 |
| 6,246,862 B1 * | 6/2001 | Grivas et al. | 455/566 |
| 6,317,614 B1 * | 11/2001 | Okada | 455/574 |
| 6,587,067 B2 * | 7/2003 | Darbee et al. | 341/176 |
| 2002/0049079 A1 * | 4/2002 | Buckley et al. | 455/568 |
| 2002/0107015 A1 * | 8/2002 | Menzel | 455/426 |
| 2003/0166409 A1 * | 9/2003 | Ishii | 455/459 |

FOREIGN PATENT DOCUMENTS

| | | |
|---|---|---|
| EP | 0 682 434 A2 | 11/1995 |
| JP | 02-073751 | 3/1990 |
| JP | 07-170226 | 7/1995 |
| JP | 08-163276 | 6/1996 |
| JP | 08-265854 | 10/1996 |
| JP | 10-200426 | 7/1998 |
| JP | 10/271199 | 10/1998 |
| JP | 11-212513 | 8/1999 |
| JP | 11-239203 | 8/1999 |
| JP | 2000-075802 | 3/2000 |
| JP | 2000-244634 | 9/2000 |
| JP | 2001-285470 | 10/2001 |
| JP | 2002-101193 | 4/2002 |

* cited by examiner

PORTABLE TERMINAL APPARATUS HAVING AN IMPROVED DISPLAY DRIVE CONTROLLER

CROSS-REFERENCE TO RELATED APPLICATIONS

Not Applicable

BACKGROUND OF THE INVENTION

1. Field of the Invention

This invention relates to a portable terminal apparatus which includes a liquid crystal display unit, such as a portable telephone and a portable information terminal (PDA).

2. Description of Related Art

Multifunction of a portable communication terminal apparatus such as a portable telephone has been progressed, and a product, which carries out data communication such as an electronic mail etc. in addition to voice telephone call, and which can browse information by accessing to various information providing servers, is in widespread use.

In case of carrying out voice telephone call by use of the suchlike portable communication terminal apparatus, a user puts his ear to a telephone receiving unit in which a receiver is disposed, and hears received voice of the other party in telephone call, and on the occasion of talking to the other party in telephone call, the user produces a sound to a telephone microphone unit in which a microphone was disposed. Also, in case of browsing data such as electronic mails and various information, a user has a housing, keeping it off from the body, and tries to take a look at various information such as characters and images which are displayed on a display unit.

In a portable communication terminal apparatus, disposed is a liquid crystal display unit having a liquid crystal display as a display unit in a general way. If the liquid crystal display unit is driven for the purpose of information display, there is such a case that a glass panel etc., which is disposed on a front face, vibrates depending on a drive system and drive frequency, to generate noises. Particularly, in recent days, miniaturization and thin-shaping of an apparatus has been progressed, together with size growing of the liquid crystal display unit, and also, there are many cases that high picture quality display is carried out, and therefore, heightened is such a possibility that vibration noises of the liquid crystal display unit and resonance noises of the housing are generated.

As described above, in the portable terminal apparatus including the liquid crystal display unit, there is such a case that a glass panel etc., which is disposed on a front face, vibrates depending on a drive system and drive frequency, to generate noises, and in particular, along with size-growing of the liquid crystal display unit, miniaturization and thin-shaping of the apparatus, high picture quality display and so on, a possibility that noises are generated is heightened. In a portable terminal apparatus having a voice telephone call function like a portable telephone, on the occasion that a user put his ear to a telephone receiver unit, the user worries about vibration noises of the liquid crystal display unit and resonance noises of the housing, so that there is such a fear that it poses a problem for a telephone call.

The invention is made in view of the above-described circumstance, and its object is to provide a portable telephone apparatus which is capable of satisfying both of securement of visibility of the display unit and suppression of noises at the time of telephone call etc. by use of a receiver and a microphone.

BRIEF SUMMARY OF THE INVENTION

A portable terminal apparatus according to the present invention, t portable terminal apparatus having a portable apparatus casing, comprising:

a display, which performs a display regarding an operation of the apparatus; and a drive controller, which determines that whether a sound output operation or sound input operation is carried out in a state that the apparatus casing is close to a head of a user, and changes a drive operation of the display.

By the above-described configuration, for example, in an apparatus which has a voice telephone call function, by judging whether or not a user uses the apparatus casing in such a state that it came close to his ear during a period of a telephone call operation, and by changing a drive operation such as a drive system, drive frequency, it becomes possible to suppress vibration noises, resonance noises etc. due to drive of the display means in case of carrying out the voice output or voice input operation. Also, by judging such a case that the apparatus casing stays away from a head of a user, a case of an in-operation other than a voice input/output operation, such as a telephone call operation, and so on, it is configured not to change a drive operation in this case, and thereby, it becomes possible to carry out drive of high picture quality display on the occasion of necessary, to secure visibility.

Further, the portable terminal apparatus, comprising a voice telephone call unit which includes a radio communicator, the drive controller determines that whether a presence or absence of use of a handsfree device which allows to telephone call in a state that the apparatus casing is away from the head of the user during a period of a telephone call operation by the voice telephone call unit, and changes at least one of a drive system of the display and drive frequency of the display when the handsfree device is not used.

By the above described configuration, by judging whether the apparatus casing is in such a state that it came close to a head of a user by presence or absence of use of the handsfree device, during a period of a telephone call operation by the voice telephone call means, and by changing a drive operation such as a drive system, drive frequency, it becomes possible to suppress vibration noises, resonance noises etc. due to drive of the display means at the time of a telephone call operation. Also, at the time of an operation other than the telephone call operation and even at the time of a telephone call operation, when the handsfree device is used, it becomes possible to carry out drive of high picture quality display and to secure visibility, by configuring not to change a drive operation.

Further, the portable terminal apparatus comprising a voice recorder which records voice information, wherein the drive controller determines that whether a presence or absence of use of a handsfree device which allows to telephone call in a state that the apparatus casing is away from the head of the user during a period of a sound recording operation or a sound reproducing operation by the voice recorder, and changes at least one of a drive system of the display and drive frequency of the display when the handsfree device is not used.

By the above-described configuration, by judging whether the apparatus casing is in such a state that it came close to a head of a user by presence or absence of use of the handsfree device, during a period of a sound recording or reproducing operation by the voice recording means, and by changing a drive operation such as a drive system, drive frequency, it becomes possible to suppress vibration noises, resonance noises etc. due to drive of the display means at the time of the sound recording or reproducing operation. Also, at the time of an operation other than the sound recording or reproducing operation, and even at the time of the sound recording or reproducing operation, when the handsfree device is used, it becomes possible to carry out drive of high picture quality display and to secure visibility, by configuring not to change a drive operation.

Further, the portable terminal apparatus comprising a sensor which detects that the apparatus casing is came close to the head of the user, the drive controller changes at least one of a drive system of the display and drive frequency of the display when a proximity state of the head is detected on the basis of a detection output of the sensor.

By the above-described configuration, by judging whether or not the apparatus casing is in such a state that it came close to a head of a user, on the basis of a detection result of the sensor means, and by changing a drive operation such as a drive system, drive frequency, it becomes possible to suppress vibration noises, resonance noises due to drive of the display means, and even in case that a user is using the apparatus casing in such a state that he approximate the apparatus casing to a head, at the time of a telephone call operation, at the time of a sound recording or reproducing operation, and so on, it becomes possible to prevent influence of noises.

Also, a portable terminal apparatus having a portable apparatus casing, the portable terminal apparatus comprising:

a display, which performs a display regarding an apparatus operation; and a drive controller, which changes a drive operation of the display on the basis of a telephone call start operation.

By the above-described configuration, by changing a drive operation such as a drive system, drive frequency on the basis of the telephone call start operation, it becomes possible to suppress vibration noises, resonance noises due to drive of the display means at the time of a telephone call operation.

Meanwhile, as to reference numerals and signs in the figures, 11 designates a telephone call circuit, and 12 designates a transmission/receiving unit, and 13 designates a receiver, and 14 designates a microphone, and 15 designates an antenna, and 16 designates a control unit, and 17 designates a storage unit, and 18 designates an operation unit, and 19 designates a display unit, and 20 designates a handsfree device, and 51 designates a sensor.

DETAILED DESCRIPTION OF THE INVENTION

Hereinafter, embodiments for carrying out the invention will be described with reference to the drawings.

Figure 1:
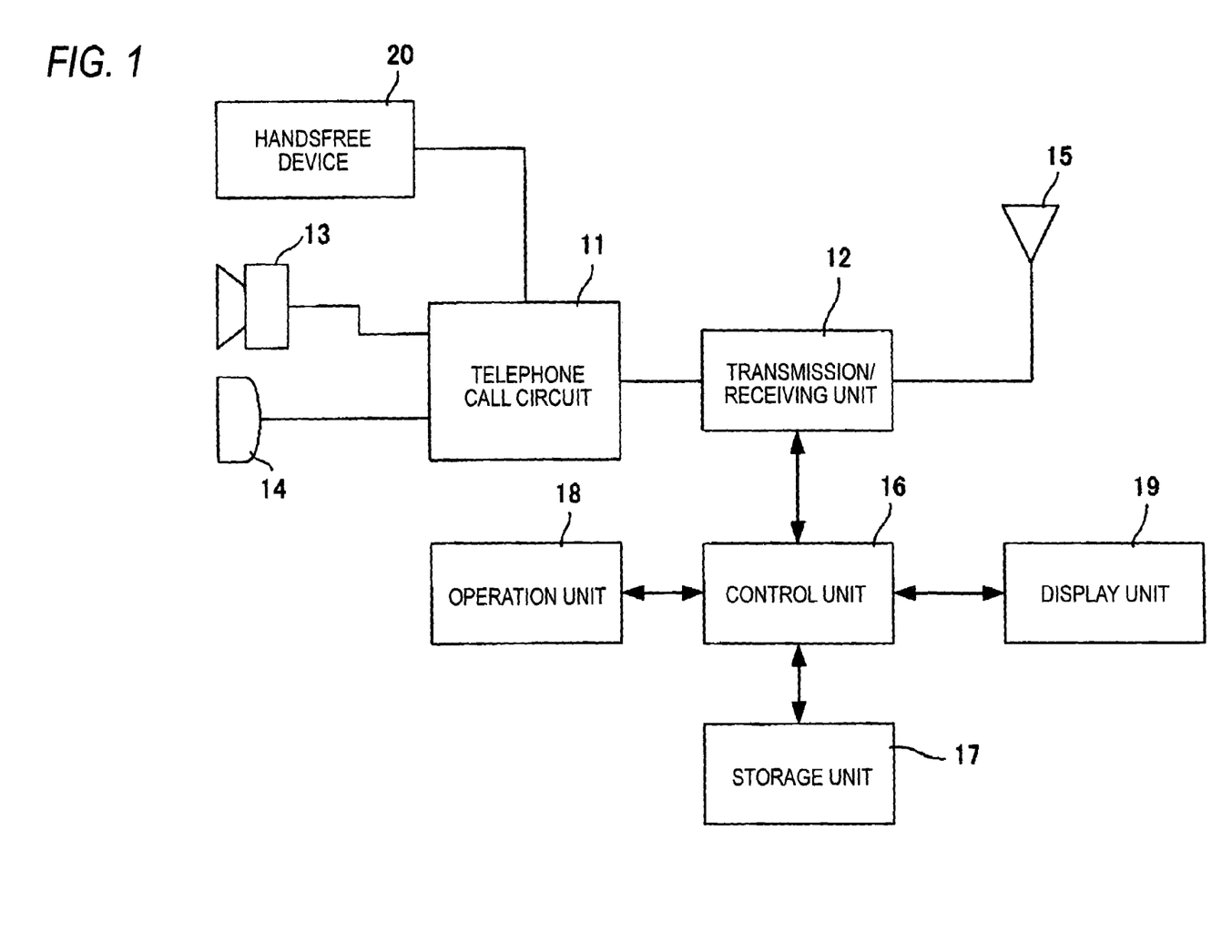
FIG. 1 is a block diagram which shows a configuration of a major part of a portable terminal apparatus according to a first embodiment of the invention.

FIG. 1 is a block diagram which shows a configuration of a major part of a portable terminal apparatus according to the first embodiment of the invention. In this embodiment, explanation will be carried out by exemplifying a portable telephone which is a mobile station terminal in a mobile communication system, as the portable terminal apparatus.

The portable telephone of this embodiment includes a telephone call circuit 11 which carries out conversion etc. of voice signals for the purpose of carrying out a voice telephone call, and a transmission/receiving unit 12 which carries out modulation of transmission signals and demodulation of reception signals, and so on, for the purpose of carrying out wireless communication, as voice telephone call mechanism. A receiver 13 for use in telephone reception, and a microphone 14 for use in telephone transmission are connected to the telephone call circuit 11. An antenna 15 for use in transmitting and receiving waves of communication electromagnetic waves is connected to the transmission/receiving unit 12. Also, the portable telephone includes a control unit (comparable to drive controller) 16 which carries out control of each part, a storage unit 17 which stores various setup data and telephone directory data etc., an operation unit 18 which has key buttons etc. for carrying out various operation inputs, and a display unit (comparable to display) 19 which has a liquid crystal display for displaying an operation state etc. of the apparatus. It is configured that data is transferred between these control unit 16 and the transmission/receiving unit 12, the storage unit 17, the operation unit 18, and the display unit 19. Further, the portable telephone is configured so as to be connected to a handsfree device 20 which has a earphone and a microphone etc. By using the handsfree device 20, it becomes possible to make a telephone call in such a state that the housing is away from a head.

In case of carrying out a voice telephone call in this portable telephone, the telephone call circuit 11 converts a sound signal which is inputted to the microphone 14 into a transmission signal, and also converts a reception signal into a sound signal to be outputted to the receiver 13. Also, the transmission/receiving unit 12 modulates the transmission signal and also demodulates the reception signal under control by the control unit 16, and transmits and receives the transmission signal and the reception signal which are exchanged with base stations through the antenna 15.

At this time, by carrying out number inputs and instruction inputs, off-hook/on-hook etc., through a key operation input by the operation unit 18, carried out are an input of a telephone number of the other party, or search of a telephone directory and designation of the other party of communication, a transmission operation, an incoming response operation, a telephone call termination operation, and so on. Also, on the display unit 19, displayed are information such as a telephone number of the other party of communication, a reception state, time and so on. Also, the storage unit 17 has a function of voice recording means, and in this storage unit 17, carried out are writing, reading of data such as various setup data, telephone directory data such as information of the other parties of communication, data of electronic mails which were transmitted or received, image data of still images or moving images, ring tone data, sound data such as voice messages.

On the occasion of driving the display unit 19 of the liquid crystal display, there is such a case that a glass panel etc., which is disposed on a front face of the display unit 19, vibrates depending on a drive system and drive frequency, to generate noises. In particular, on the occasion that a user puts a telephone receiver unit having the receiver 13 to his ear, during a period of a telephone call of a portable telephone and during a period of recording, reproducing sounds, the user notably feel vibration noises of the display unit and resonance noises of the housing.

Consequently, in this embodiment, on the occasion of using the receiver 13 and the microphone 14, such as at the time of a telephone call and at the time of sound recording and reproducing, a drive operation such as a drive system, drive frequency of the display unit 19 is changed so that the vibration noises of the display unit 19 and the resonance noises of the housing are suppressed. In this case, giving a high regard for acoustic characteristics at the time of using the receiver 13 and the microphone 14, driving with few noise is carried out, so that noises due to the liquid crystal display are suppressed. On one hand, giving a high regard for optical characteristics of display images at the time of browsing the display unit 19 and at the time of using the handsfree device 20, driving with high picture quality is carried out, and visibility is improved.

Figure 2:
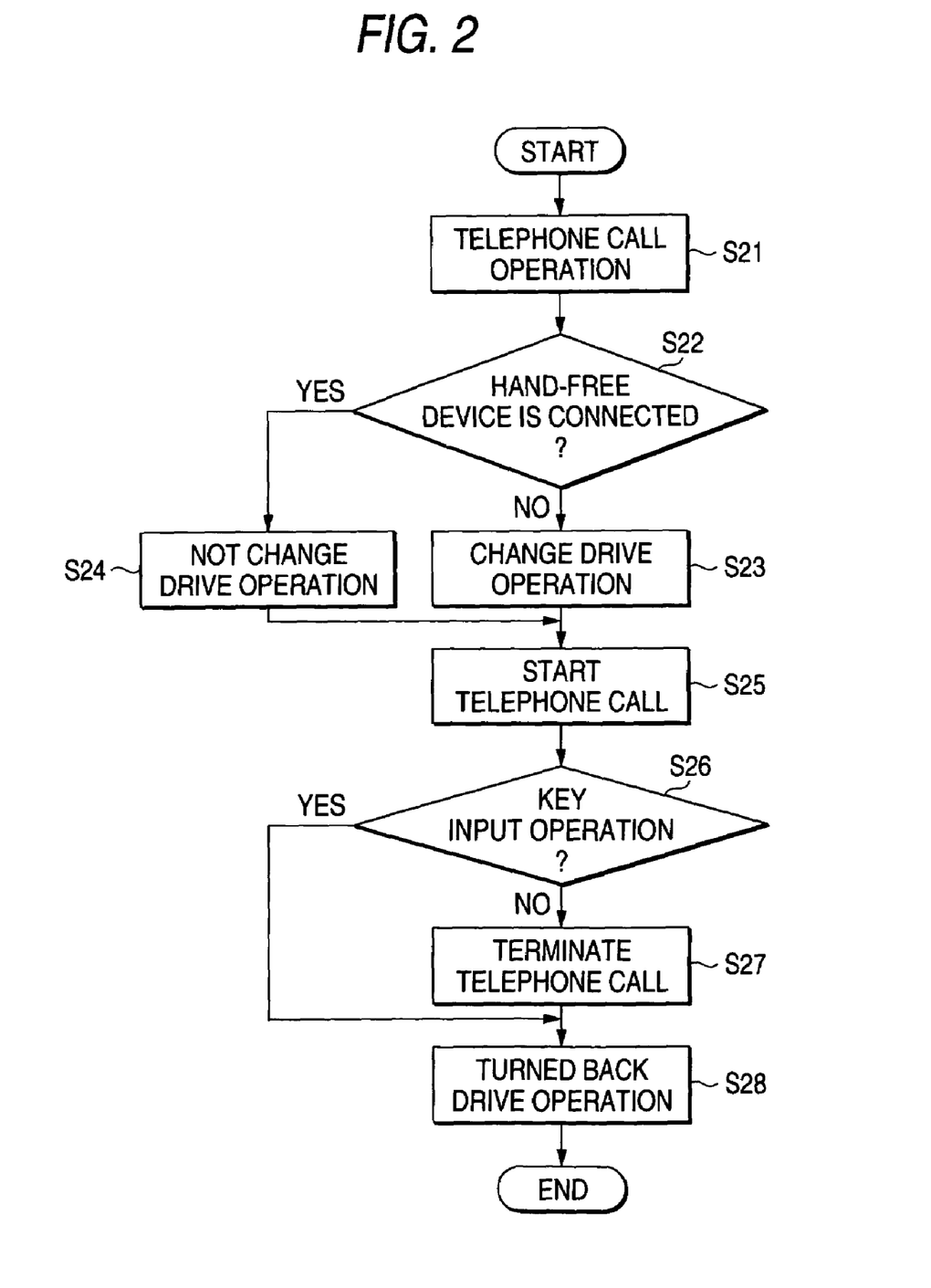
FIG. 2 is a flow chart which shows a major operation of a portable telephone of the first embodiment.

FIG. 2 is a flow chart which shows a major operation of the portable telephone in the first embodiment. In the first embodiment, on the occasion that a telephone call operation of the portable telephone was carried out, it is judged whether or not the receiver 13 and the microphone 14 are used, depending on whether the handsfree device 20 is connected or not, and a drive operation such as a drive system, drive frequency is changed.

In a step S21, when a telephone call operation such as on-hook is carried out, it is judged in a step S22 whether the handsfree device 20, which includes a earphone and a microphone etc., is connected or not, and in case that the handsfree device 20 is not connected, it goes to a step S23 to change a drive operation. Here, as the drive operation, at least one of a drive system and drive frequency is changed. On one hand, in case that the handsfree device 20 is connected, it goes to a step S24 to leave unchanged without changing the drive operation.

In case of changing the drive system, it is switched in a manner of 1 line reverse drive→frame reverse drive, etc. The 1 line reverse drive is of high picture quality but there is such a possibility that resonance noises are generated at the time of driving, and therefore, when the receiver 13 and the microphone 14 are used at the time of a telephone call etc., it is switched to the frame reverse drive, giving priority over sound quality.

In case of changing the drive frequency, frequency is decreased for the purpose of reduction of the resonance noises. Also, there is such a case that frequency is increased for the purpose of suppressing flickers etc. on a display screen, which comes up with the change of the drive system. For example, in case that it is possible to reduce the resonance noises by lowering the drive frequency in the 1 line reverse drive etc., it may be all right even if only the drive frequency is changed. On one hand, in case that flickers on the display screen are highly visible in the frame reverse drive, the drive frequency is increased to such a level that the resonance noises are not generated, to keep visibility.

Then, in a step S25, a telephone call is started. After that, it is judged in a step S26 whether a key input operation was carried out or not, and in case that there was a character input operation such as memo of character information, or another key input operation, during a period of a telephone call, it goes to a step S28 to turn back the drive operation such as the drive system and drive frequency. In case that there is no key input operation, a telephone call termination operation such as off-hook is carried out in a step S27, and after the telephone call is terminated, it goes to the step S28, to turn back the drive operation.

Meanwhile, when the drive system is changed, it may be all right even if a drive voltage is also changed for the purpose of preventing picture quality deterioration. For example, by lowering the drive voltage, contrast and density of the display screen are lowered, to suppress a cross talk in which a black portion in the display screen is viewed in a blurred manner in a vertical direction.

Also, it may be all right even if screen design is also changed, for the purpose of preventing picture quality deterioration at the time of changing the drive system. For example, a display color in a display screen is changed, and a neutral color, in which flickers etc. are highly visible, is changed to a white color and a black color, a reference color of RGB, etc., to heighten visibility.

Meanwhile, in the flow chart of FIG. 2, it may be all right even if change of a drive operation in the step S23 is automatically carried out when a telephone call operation in the step S21 is carried out. In this case, handsfree judgment is made unnecessary.

In this manner, in this embodiment, in case that the handsfree device is not connected at the time of a telephone call of the portable telephone, it is designed so as to change a drive operation such as a drive system, drive frequency, by assuming that a user is making a telephone call by use of a receiver and a microphone in a main body of the portable telephone in such a state that he puts the housing to his head. By this, during a period of a telephone call using a receiver and a microphone, it is possible to suppress the vibration noises and resonance noises due to drive of the liquid crystal display unit by use of a drive system and drive frequency giving priority over sound quality. Also, by this drive giving priority over sound quality, it is possible to reduce electric power consumption. On one hand, in case of accessing to various information providing servers to display and browse information on a screen, and so on, by using a drive system and drive frequency giving priority over sound quality at the time of other operations, it is possible to carry out high picture quality display as needed, so as to maintain visibility. Therefore, it is possible to satisfy both of high picture quality display and noise suppression in accordance with an operation mode.

Figure 3:
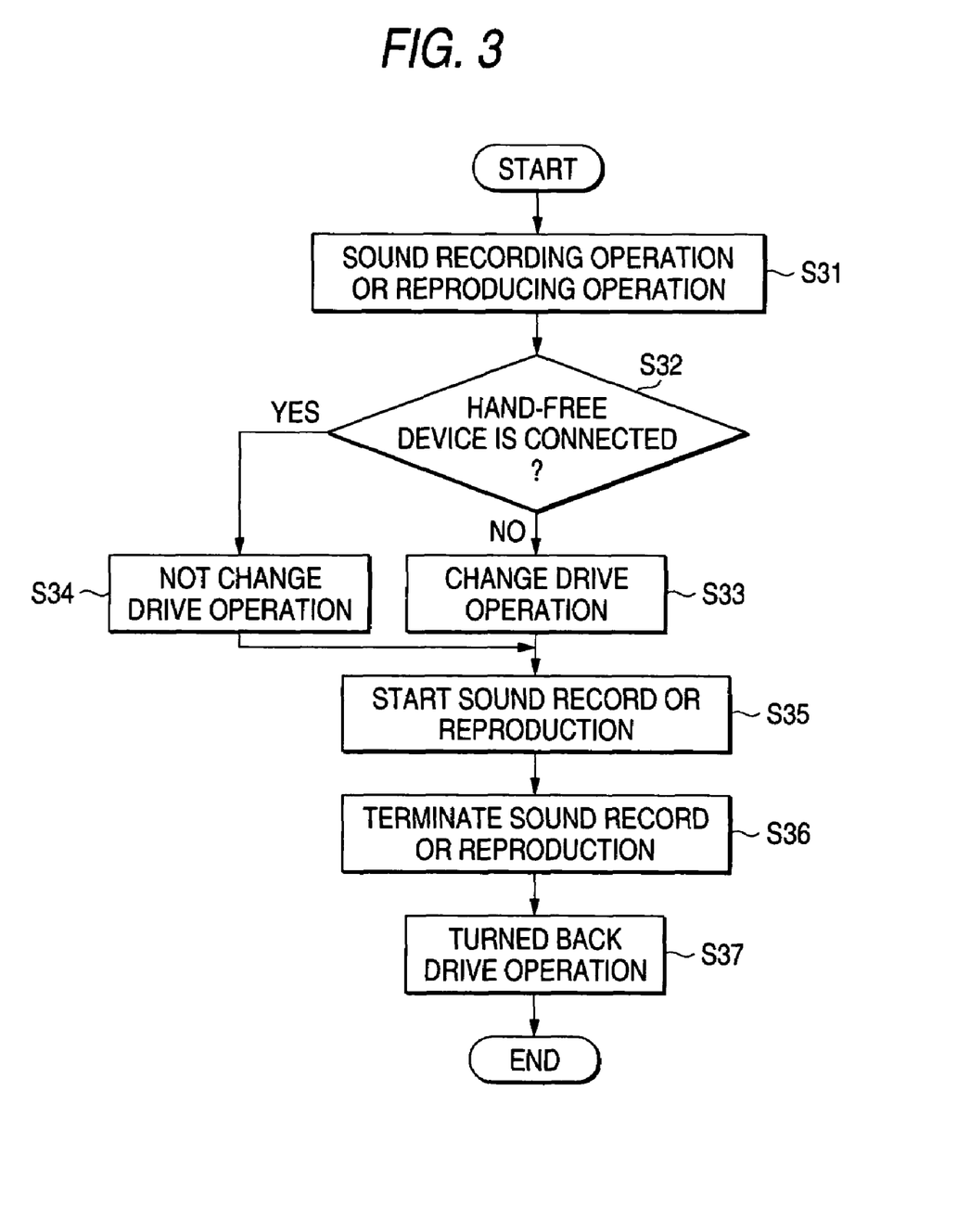
FIG. 3 is a flow chart which shows a major operation of a portable telephone according to a second embodiment of the invention.

FIG. 3 is a flow chart which shows a major operation of a portable telephone of the second embodiment of the invention. In the second embodiment, on the occasion that a sound recording operation such as a voice memorandum or a reproducing operation is carried out, use of the receiver 13 and the microphone 14 in the main body is judged depending upon whether the handsfree device 20 is connected or not, in the same manner as in the first embodiment, to change a drive operation such as a drive system and drive frequency. An apparatus configuration and other operations are the same as in the first embodiment, and therefore, explanations will be omitted.

When a sound recording operation or a reproducing operation by a memorandum key etc. is carried out in a step S31, it is judged whether the handsfree device 20 is connected or not in a step S32, and in case that the handsfree device 20 is not connected, it goes to a step S33, and in the same manner as in the first embodiment, a drive operation such as a drive system, drive frequency is changed. On one hand, in case that the handsfree device 20 is connected, it goes to a step S34, it is left unchanged without changing the drive operation.

Then, in a step S35, sound record or reproduction is started. After that, in a step S36, when a sound record termination operation or a reproduction termination operation by an operation of a memorandum key etc. is carried out and sound record or reproduction is terminated, a drive operation such as a drive system and drive frequency is to be turned back in a step S37.

In this manner, in this embodiment, on the occasion of carrying out a sound recording or reproducing operation at the time of a telephone call or standby of the portable telephone, in case that the handsfree device is not connected, it is assumed that a user is using a receiver and a microphone in a main body of the portable telephone in such a state that he put a housing to his head, and a drive operation such as a drive system, drive frequency is to be changed. As a result, during a period of sound recording and reproducing operations using a receiver and a microphone, it is possible to suppress vibration noises and resonance noises due to drive of the liquid crystal display unit by use of a drive system and drive frequency giving priority over sound quality. Also, by using the drive system and drive frequency giving priority over sound quality at the time of other operations, it is possible to carry out high picture quality display, and it is possible to satisfy both of securement of visibility and noise suppression at the time of sound record/reproduction at the time of display screen browse, etc.

Figure 4:
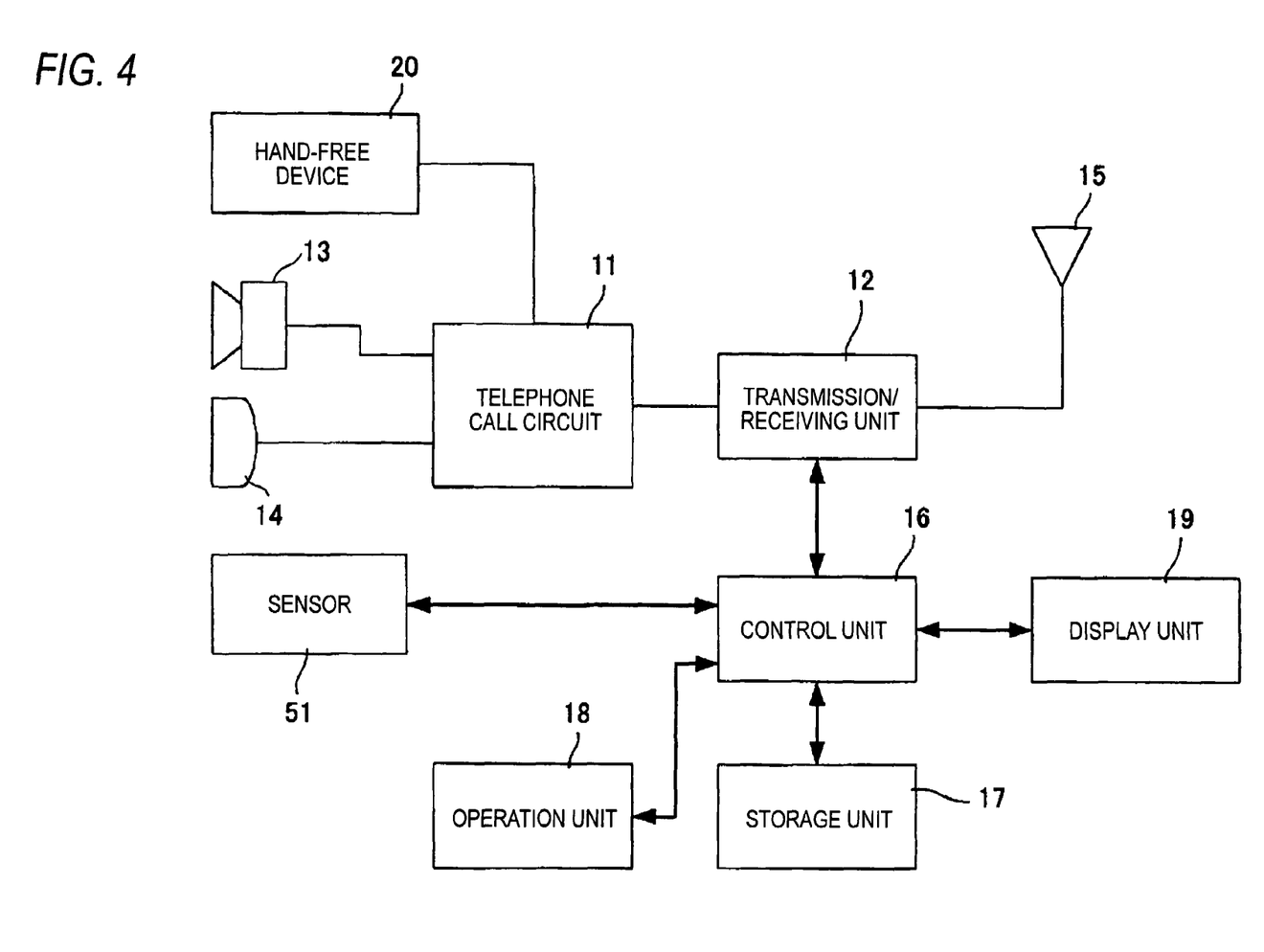
FIG. 4 is a block diagram which shows a configuration of a major part of a portable terminal apparatus according to a third embodiment of the invention.

FIG. 4 is a block diagram which shows a configuration of a major part of a portable terminal apparatus according to the third embodiment of the invention. In addition to the configuration of the first embodiment, the third embodiment further includes a sensor (comparable to sensor) 51 which detects that a head of a user came close, so that it is designed to judge whether a drive operation is changed or not. Other configuration and operations are the same as in the first embodiment, therefore explanations will be omitted.

The sensor 51 is configured by using a proximity sensor which detects proximity of a head of a user and contact of a ear part and so on, or a photo sensor which detects brightness such as a dark state due to proximity of a head, and so on, and it is designed that a detection output of the sensor 51 is inputted to the control unit 16.

Figure 5:
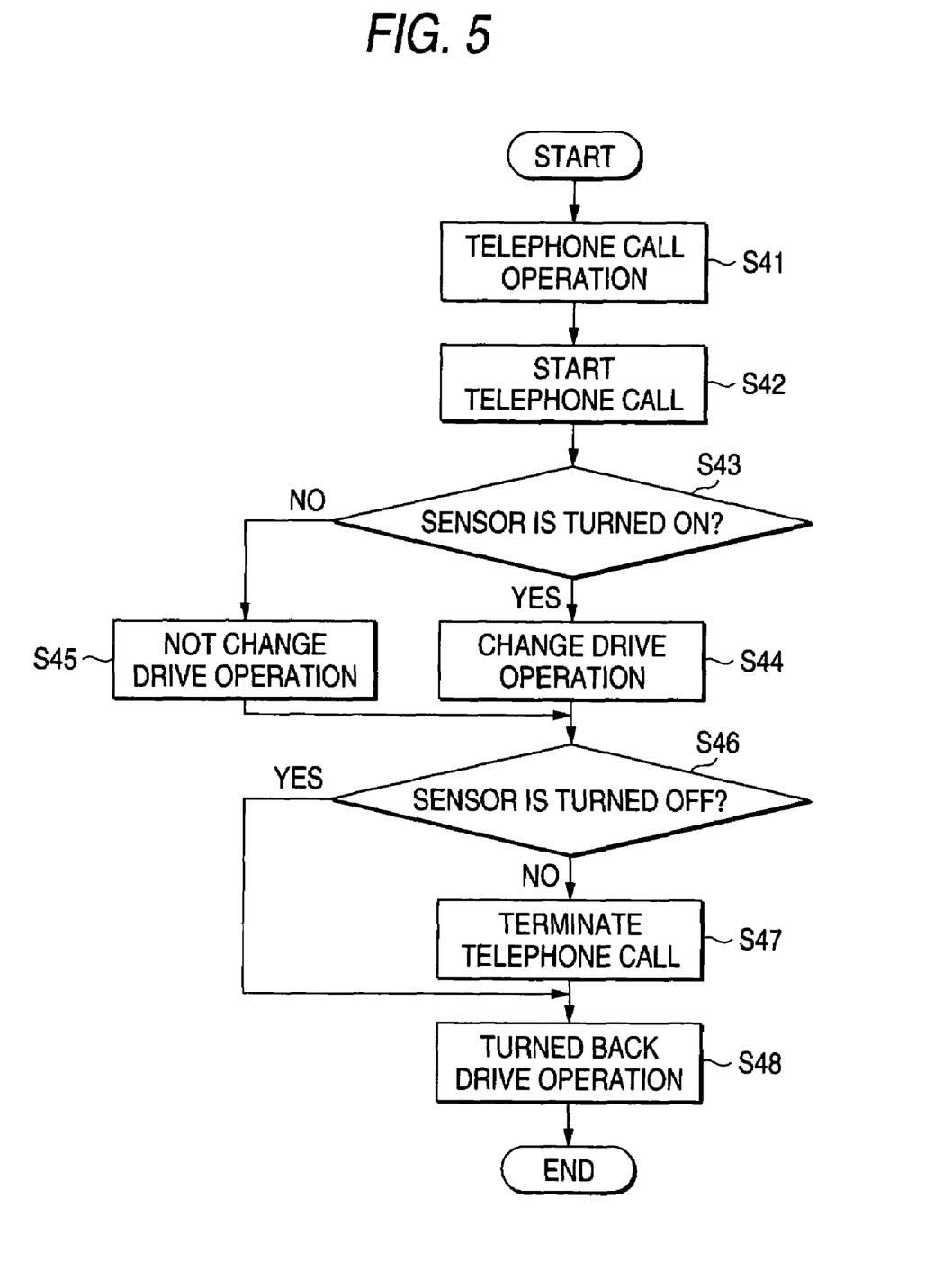
FIG. 5 is a flow chart which shows a major operation of a portable telephone of the third embodiment.

FIG. 5 is a flow chart which shows a major operation of a portable telephone of the third embodiment. In a step S41, when a telephone call operation such as on-hook is carried out, a telephone call is started in a step S42. After that, in a step S43, a detection signal is outputted by the sensor 51 to become sensor-on, and when it is detected that a head of a user came close, it is judged that a user is using a receiver and a microphone in a main body of the portable telephone in such a state that he put a housing to his head, and it goes to a step S44, and a drive operation such as a drive system, drive frequency is changed in the same manner as in the first embodiment. On one hand, in case that a head of a user is not detected by the sensor 51, it goes to a step S45, and it is left unchanged without changing the drive operation.

Then, in a step S46, in case that the detection signal from the sensor 51 is stopped to become sensor-off and it is turned into such a state that a head of a user is not detected, or in case of sensor-off from the beginning, it is judged that a head of a user stays away from a housing, and it goes to a step S48 so as to turn back a drive operation such as a drive system and drive frequency. In case that the detection output of the sensor 51 is kept in sensor-on, it goes to a step S48 so as to turn back the drive operation, after a telephone call termination operation such as off-hook is carried out in a step S47 and a telephone call is terminated.

In this manner, in this embodiment, it is designed to change a drive operation such as a drive system, drive frequency, by detecting that a head of a user came close by use of the sensor. By this, it is possible to suppress vibration noises and resonance noises due to drive of a liquid crystal display unit by use of a drive system and drive frequency giving priority over sound quality, when a user approximates his head to a housing and carries out a telephone call etc. Also, when a user gets off his head from the housing and carries out browse of a display screen and so on, it is possible to carry out high picture quality display by use of the drive system and drive frequency giving priority over picture quality, and it is possible to satisfy both of securement of visibility at the time that high picture quality is needed and noise suppression at the time of a telephone call etc.

The invention is described in detail and also with reference to specific embodiments, but it is obvious to a person with ordinary skill in the part that it is possible to add various changes and modifications without departing from spirit and a scope of the invention.

This application is based upon Japanese patent application No. 2002-122443 filed on Apr. 24, 2002, and the contents of this Japanese Patent Application are incorporated as a reference.

INDUSTRIAL APPLICABILITY

As described above, according to the invention, it is possible to provide a portable terminal apparatus which can satisfy both of securement of visibility of a display unit and suppression of noises at the time of a telephone call etc. by use of a receiver and a microphone.

The invention claimed is:

1. A portable terminal apparatus having a portable apparatus casing, the portable terminal apparatus comprising:
   a display for displaying information; and
   a drive controller, which changes at least one of contrast of the display screen density of the display screen, and a drive frequency of the display on the basis of a telephone call start operation.

2. The portable terminal apparatus as set forth in claim 1, further comprising a voice telephone call unit which includes a radio communicator,
   wherein the drive controller changes at least one of a drive system of the display and the drive frequency of the display when a handsfree device is not used with the portable terminal apparatus.

3. The portable terminal apparatus as set forth in claim 1, further comprising a voice recorder which records voice information,
   wherein the drive controller changes at least one of a drive system of the display and the drive frequency of the display when a handsfree device is not used with the portable terminal apparatus.

4. The portable terminal apparatus as set forth in claim 1, wherein a drive system of the display is related to a picture quality.

5. The portable terminal apparatus as set forth in claim 1, wherein a drive system of the display is related to a sound quality.

6. A portable terminal apparatus having a portable apparatus casing, the portable terminal apparatus comprising:

a display for displaying information; and a drive controller for changing at least one of contrast of the display screen density of the display screen, and a drive frequency of the display based on a carrying out of a sound output operation or a sound input operation.

7. The portable terminal apparatus as set forth in claim 6, further comprising a voice telephone call unit which includes a radio communicator, wherein the drive controller changes at least one of a drive system of the display and the drive frequency of the display when a handsfree device is not used with the portable terminal apparatus.

8. The portable terminal apparatus as set forth in claim 6, further comprising a voice recorder which records voice information, wherein the drive controller changes at least one of a drive system of the display and the drive frequency of the display when a handsfree device is not used with the portable terminal apparatus.

9. The portable terminal apparatus as set forth in claim 6, further comprising a sensor which detects that the apparatus casing is close to the head of the user, wherein the drive controller changes at least one of a drive system of the display and the drive frequency of the display when a proximity state of the head is detected on the basis of a detection output of the sensor.

10. The portable terminal apparatus as set forth in claim 6, wherein a drive system of the display is related to a picture quality.

11. The portable terminal apparatus as set forth in claim 6, wherein a drive system of the display is related to a sound quality.

12. A portable terminal apparatus having a portable apparatus casing, the portable terminal apparatus comprising:

a display for displaying information;

a key button for starting a telephone call; and a drive controller, which changes at least one of contrast of a display screen density of the display screen, and a drive frequency of the display when the key button is operated.

13. The portable terminal apparatus as set forth in claim 12, further comprising a voice telephone call unit which includes a radio communicator, wherein the drive controller changes at least one of a drive system of the display and the drive frequency of the display when a handsfree device is not used with the portable terminal apparatus.

14. The portable terminal apparatus as set forth in claim 12, further comprising a voice recorder which records voice information, wherein the drive controller changes at least one of a drive system of the display and the drive frequency of the display when a handsfree device is not used with the portable terminal apparatus.

15. The portable terminal apparatus as set forth in claim 12, wherein a drive system for the display is related to a picture quality.

16. The portable terminal apparatus as set forth in claim 12, wherein a drive system for the display is related to a sound quality.

17. A portable terminal apparatus having a portable apparatus casing, the portable terminal apparatus comprising:

a display for displaying information; and a drive controller, wherein the drive controller changes a drive operation of the display from a "one line reverse operation" to a "frame reverse operation" based on a carrying out of a sound output operation or a sound input operation.

18. A portable terminal apparatus having a portable apparatus casing, the portable terminal apparatus comprising:

a display for displaying information; and a drive controller, wherein the drive controller changes a drive operation of the display from a "one line reverse operation" to a "frame reverse operation" on the basis of a telephone call start operation.

19. A portable terminal apparatus having a portable apparatus casing, the portable terminal apparatus comprising:

a display for displaying information;

a key button for starting a telephone call; and a drive controller, wherein the drive controller changes a drive operation of the display from a "one line reverse operation" to a "frame reverse operation" when the key button is operated.

* * * * *